(12) United States Patent
Nakatsu

(10) Patent No.: US 8,948,971 B2
(45) Date of Patent: Feb. 3, 2015

(54) STEERING CONTROL DEVICE

(75) Inventor: Masatoshi Nakatsu, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 49 days.

(21) Appl. No.: 13/515,697

(22) PCT Filed: Feb. 25, 2010

(86) PCT No.: PCT/JP2010/052972
§ 371 (c)(1),
(2), (4) Date: Jun. 13, 2012

(87) PCT Pub. No.: WO2011/104846
PCT Pub. Date: Sep. 1, 2011

(65) Prior Publication Data
US 2013/0035826 A1 Feb. 7, 2013

(51) Int. Cl.
*A01B 69/00* (2006.01)
*B62D 6/00* (2006.01)
*B62D 5/04* (2006.01)
*B62D 5/00* (2006.01)
*B62D 15/02* (2006.01)

(52) U.S. Cl.
CPC .............. *B62D 5/0457* (2013.01); *B62D 5/001* (2013.01); *B62D 15/0245* (2013.01)
USPC ................. 701/41; 701/48; 701/36; 180/408; 180/19.32; 180/252; 180/6.2; 180/9.38

(58) Field of Classification Search
CPC .......... B62D 1/166; B62D 5/008; B62D 5/00; B62D 1/12; B62D 1/04; B62D 15/0245; F02D 11/10; F02D 9/1065; G01L 5/221; F16H 2061/0087
See application file for complete search history.

(56) References Cited

U.S. PATENT DOCUMENTS 6,722,610 B1 *  4/2004  Rawdon et al. .......... 244/103 W
7,478,689 B1 *  1/2009  Sugden et al. ............... 180/19.3
(Continued)

FOREIGN PATENT DOCUMENTS

DE  44 04 594 A1  8/1995
DE  103 02 559 A1  9/2004
(Continued)

OTHER PUBLICATIONS

International Search Report issued in International Patent Application No. PCT/JP2010/052972 dated May 11, 2010.

*Primary Examiner* — Helal A Algahaim
*Assistant Examiner* — Paul Castro
(74) *Attorney, Agent, or Firm* — Oliff PLC

(57) ABSTRACT

Disclosed is a steering control device capable of adjusting reference points of a plurality of motions, which are used for a steering operation in a steering operating unit, with high precision. In the steering control device, a control unit performs N-point learning under the condition that the absolute value of an operating amount in operation systems other than a target is smaller than a predetermined value (or substantially 0). This makes it possible to suppress the influence of operation systems other than the target on the steering of a vehicle M during N-point learning, making it possible to learn the N point in the operation system of the target with high precision. With this N-point learning for each target, even in an operation system which can be steered through a plurality of motions, it is possible to learn the N point of each motion with high precision.

8 Claims, 15 Drawing Sheets

(56) References Cited

U.S. PATENT DOCUMENTS

| | | |
|---|---|---|
| 7,552,794 B2 | 6/2009 | Tamura et al. |
| 2006/0129294 A1 | 6/2006 | Moser et al. |
| 2006/0293818 A1* | 12/2006 | Lu et al. .......................... 701/41 |
| 2008/0023250 A1* | 1/2008 | Hefner et al. ................ 180/332 |
| 2011/0118940 A1* | 5/2011 | Kariatsumari et al. ......... 701/42 |
| 2013/0076283 A1* | 3/2013 | Kariatsumari et al. .. 318/400.15 |

FOREIGN PATENT DOCUMENTS

| | | |
|---|---|---|
| JP | A-62-290912 | 12/1987 |
| JP | A-3-204377 | 9/1991 |
| JP | A-3-204378 | 9/1991 |
| JP | A-8-50532 | 2/1996 |
| JP | A-2000-52997 | 2/2000 |
| JP | A-2003-165445 | 6/2003 |
| JP | A-2005-225384 | 8/2005 |
| JP | A-2006-160123 | 6/2006 |
| JP | A-2006-264512 | 10/2006 |
| JP | A-2007-246003 | 9/2007 |
| JP | A-2007-308098 | 11/2007 |
| JP | A-2008-81042 | 4/2008 |
| JP | A-2008-168840 | 7/2008 |
| JP | A-2008-230427 | 10/2008 |
| JP | A-2011-152831 | 8/2011 |

* cited by examiner

Fig.5
(a)
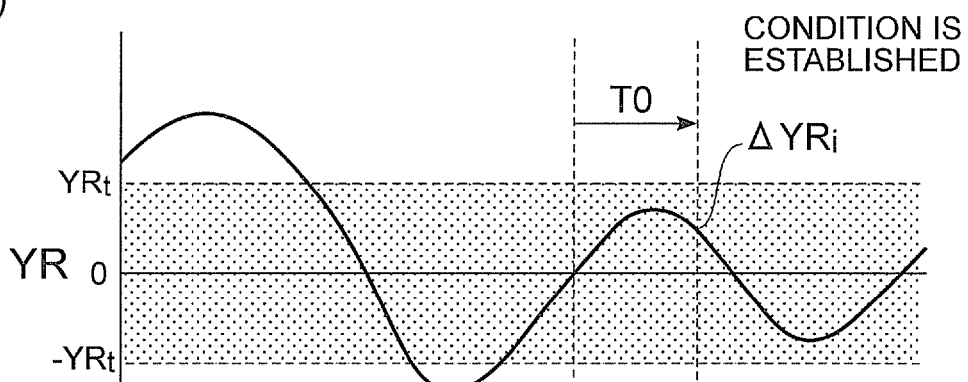
(b)
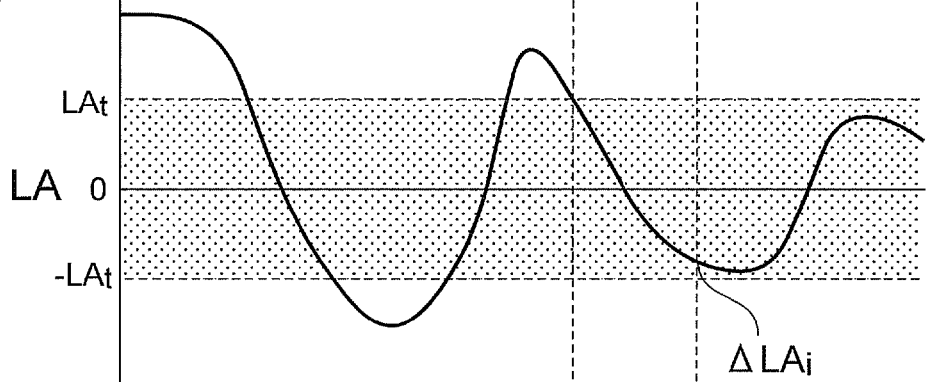
(c)
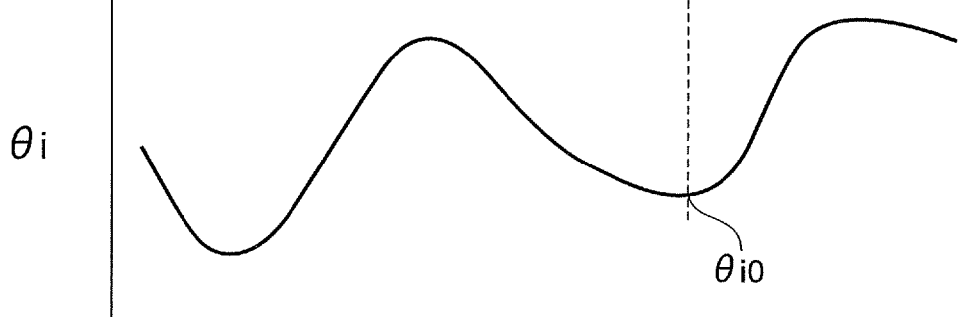

STEERING CONTROL DEVICE

TECHNICAL FIELD

The present invention relates to a steering control device.

BACKGROUND ART

In the related art, as a steering control device, a steering device described in Japanese Unexamined Patent Application Publication No. 2006-264512 in which a slide operation of a steering in the vehicle longitudinal direction is possible as well as a normal operation of rotating the steering is known. In this device, if the slide operation in the vehicle longitudinal direction is performed, the displacement from the neutral position of the steering is detected by a sensor, and a steering motor is driven on the basis of the detected displacement to steer the front wheels.

CITATION LIST

Patent Literature

[Patent Literature 1] Japanese Unexamined Patent Application Publication No. 2006-264512

SUMMARY OF INVENTION

Technical Problem

In the above-described device, for example, when power is not supplied to the sensor due to deterioration of a battery, or the like, even if power is subsequently resupplied, the neutral position stored in the sensor may be shifted from the actual neutral position, or the neutral position stored in the sensor may be erased. However, in the above-described device, the adjustment of a reference point, such as a neutral position, does not become clear. For this reason, it is difficult to adjust reference points of a plurality of motions, such as rotation and slide, which are used for a steering operation in the steering, with high precision.

Accordingly, the invention has been finalized in order to solve the above-described technical problem, and an object of the invention is to provide a steering control device capable of adjusting reference points of a plurality of motions, which are used for a steering operation in a steering operating unit, with high precision.

Solution to Problem

That is, a steering control device according to the invention includes a steering operating unit which can be steered through a plurality of different motions, and a control unit which performs steering control of a vehicle through a plurality of operation systems corresponding to the plurality of motions on the basis of an input value input by each of the plurality of motions. When adjusting a reference point of a motion in at least one operation system from among the plurality of operation systems, the control unit adjusts the reference point under the condition that the absolute value of an operating amount in at least one operation system from among operation systems other than the operation system where the reference point is adjusted is smaller than a predetermined value.

In the steering control device according to the invention, the control unit adjusts the reference point under the condition that the absolute value of the operating amount in the operation systems other than the operation system where the reference point is adjusted is smaller than the predetermined value. For this reason, during the adjustment of the reference point, it is possible to suppress the influence of operation systems other than the operation system as an adjustment target on the steering of the vehicle. Accordingly, it is possible to adjust the reference point in the operation system as an adjustment target with high precision. This adjustment is performed through each operation system, such that, even in the steering operating unit which can be steered through a plurality of motions, it is possible to adjust the reference point of each motion with high precision. The operating amount is the displacement of the input value input by the steering operating unit from the neutral point.

A steering control device according to the invention includes a steering operating unit which can be steered through a plurality of different motions, and a control unit which performs steering control of a vehicle through a plurality of operation systems corresponding to the plurality of motions on the basis of an input value input by each of the plurality of motions. When adjusting a reference point of a motion in at least one operation system from among the plurality of operation systems, the control unit reduces a control amount in at least one operation system from among operation systems other than the operation system where the reference point is adjusted.

In the steering control device according to the invention, when the reference point is adjusted by the control unit, the control amount in the operation system other than the operation system where the reference point is adjusted is reduced. Accordingly, it is possible to reduce the influence of operation systems other than the operation system as an adjustment target on the steering of the vehicle. Therefore, it is possible to adjust the reference point in the operation system as an adjustment target with high precision. This adjustment is performed through each operation system, such that, even in the steering operating unit which can be steered through a plurality of motions, it is possible to adjust the reference point of each motion with high precision.

It is preferable that, while a reference point of a motion in one operation system included in the plurality of operation systems is being adjusted, the control unit does not adjust a reference point of a motion in another operation system different from the one operation system.

According to the invention, there is no case where the reference point is adjusted simultaneously in one operation system from among a plurality of operation systems and another operation system. Therefore, reference point errors are substantially constant in each operation system, thereby reducing variations in the precision of the operation systems.

It is preferable that the control unit adjusts a reference point of a motion in the plurality of operation systems in a prescribed sequence.

According to the invention, the reference points of the motions in a plurality of operation systems are adjusted in a prescribed sequence. Therefore, there is no case where the reference point is adjusted simultaneously through different operation systems, and reference point errors are substantially constant in each operation system, thereby reducing variations in the precision of the operation systems.

It is preferable that the plurality of motions in the steering operating unit include a rotational motion of rotating a steering wheel around a shaft line of a steering shaft linked to the steering wheel, and the control unit initially adjusts a reference point in an operation system corresponding to the rotational motion.

According to the invention, the reference point of the rotational motion of the steering wheel from among a plurality of motions in the steering operating unit is initially adjusted. Accordingly, even if a reference point of a motion other than the rotational motion has an error and is adjusted, since the reference point of the rotational motion is already adjusted, it is possible to prevent the influence of the error on the reference point of the rotational motion.

It is preferable that the control unit has a traveling state determination unit which calculates the differential value of the traveling state of the vehicle relative to a reference traveling state, and determines that the vehicle is in the reference traveling state when the absolute value of the calculated differential value is continuously smaller than a predetermined threshold value for a given time, and a reference point adjustment unit which, when the traveling state determination unit determines that the vehicle is in the reference traveling state, adjusts a reference point such that the absolute value of a value obtained by totaling the differential value at the time of reference point adjustment in each operation system as an adjustment target is smaller than a given value.

According to the invention, the reference point adjustment unit adjusts the reference point such that the absolute value of the value obtained by totaling the differential value at the time of reference point adjustment in each operation system as an adjustment target is smaller than the given value. Accordingly, it is possible to reduce the average of the reference point errors in each operation system. Therefore, it is possible to maintain the reference point of each motion in a high precision state.

It is preferable that the plurality of motions in the steering operating unit include a main motion and a sub motion other than the main motion, and when adjusting a reference point of a motion in a sub operation system corresponding to the sub motion, the control unit does not reduce a control amount in a main operation system corresponding to the main motion.

According to the invention, when adjusting the reference point of the motion in the sub operation system corresponding to the sub motion, the control amount in the main operation system corresponding to the main motion is not reduced, thereby operating the vehicle by the main motion without problem.

Advantageous Effects of Invention

According to the invention, it is possible to adjust reference points of a plurality of motions, which are used for a steering operation in a steering operating unit, with high precision.

BRIEF DESCRIPTION OF DRAWINGS

FIG. 5 is an explanatory view of N-point learning in an N-point learning process.

DESCRIPTION OF EMBODIMENTS

Figure 1:
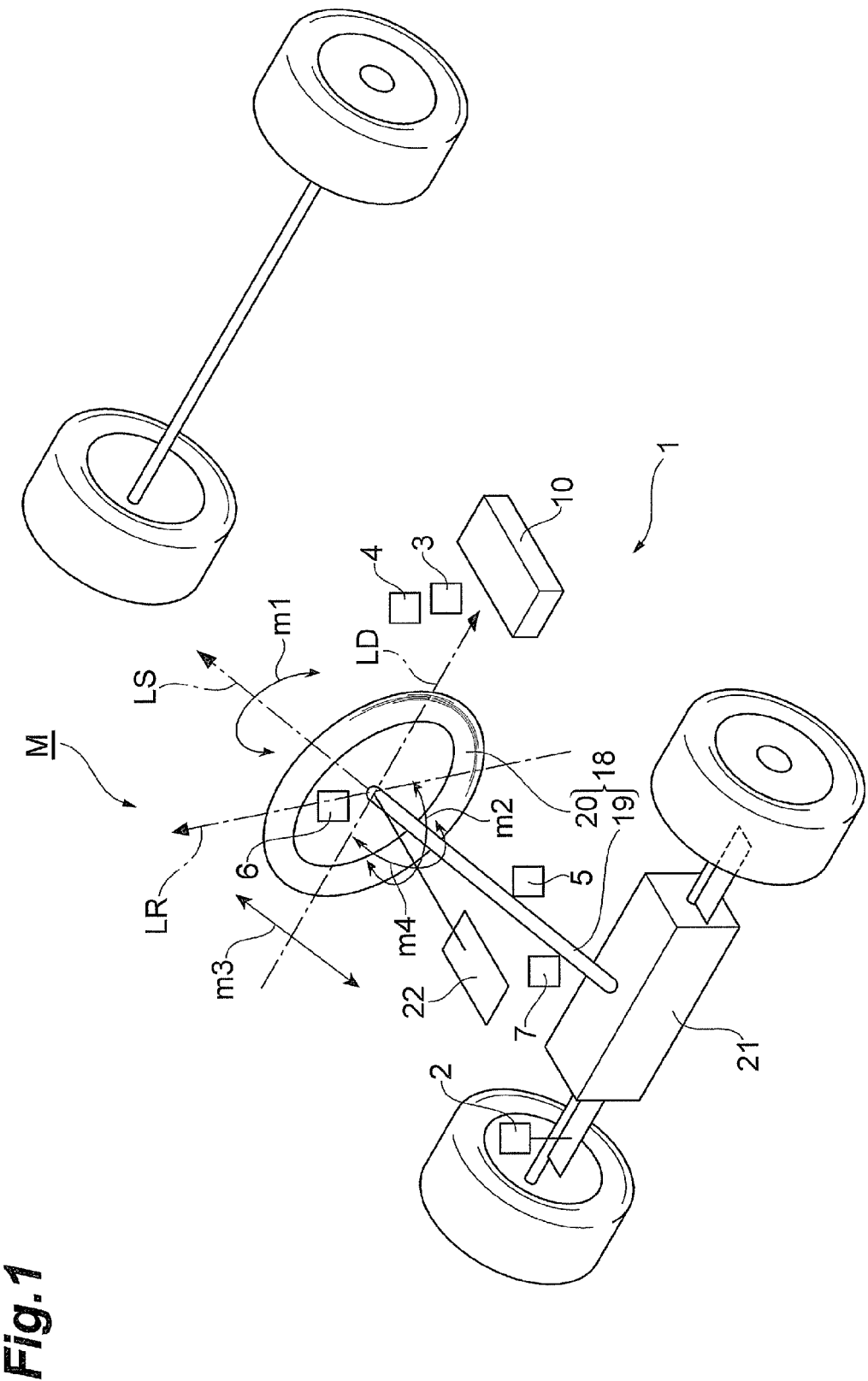
FIG. 1 is a diagram showing the internal configuration of a vehicle in which a steering control device according to a first embodiment of the invention is mounted.

Hereinafter, embodiments of the invention will be described with reference to the drawings. In the description of the drawings, the same parts are represented by the same reference numerals, and overlapping description will be omitted.

First Embodiment

Figure 2:
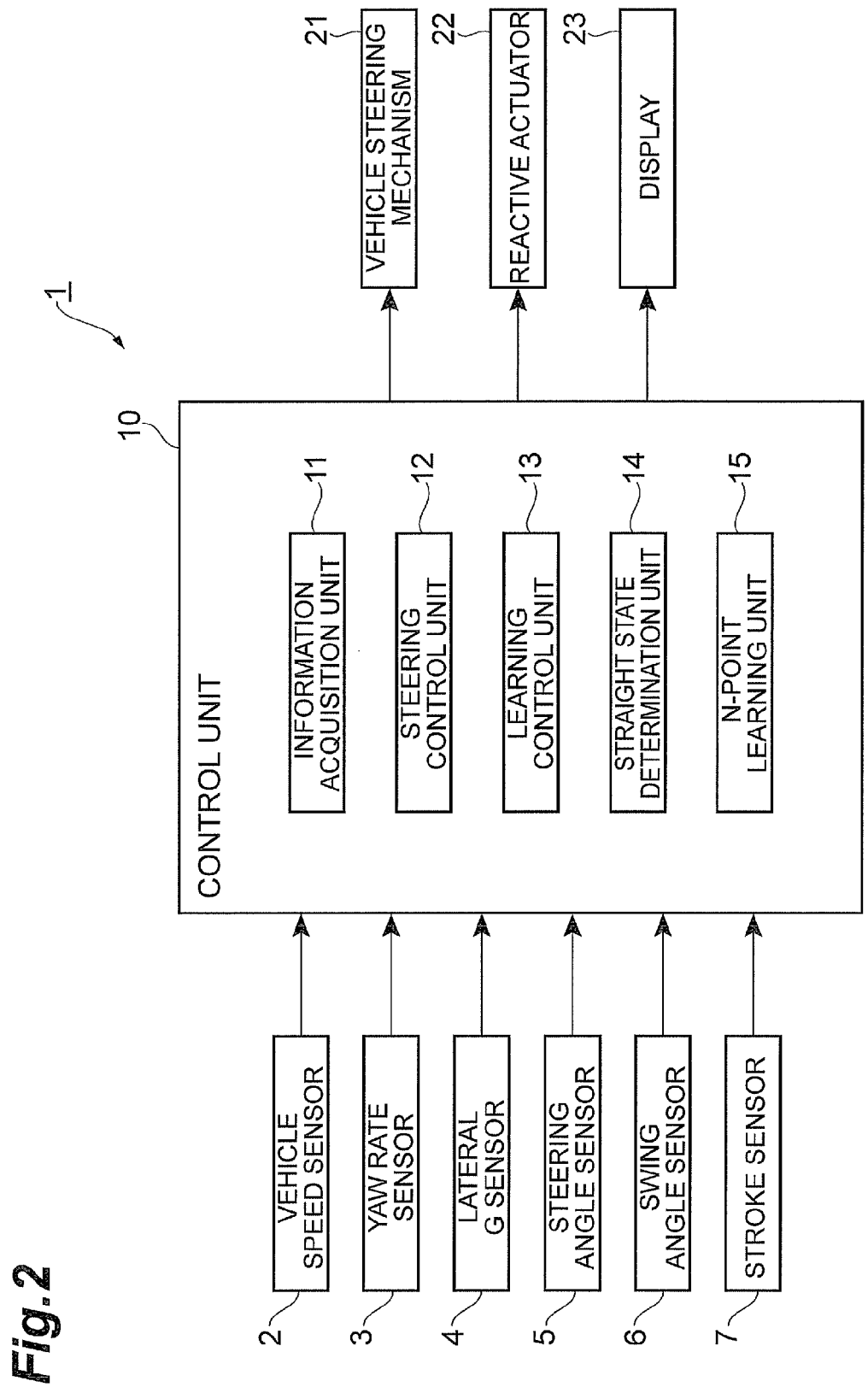
FIG. 2 is a block diagram showing the steering control device in FIG. 1.

FIG. 1 is a diagram showing the internal configuration of a vehicle in which a steering control device according to a first embodiment of the invention is mounted. FIG. 2 is a block diagram showing the steering control device in FIG. 1. As shown in FIG. 1, a steering control device 1 of this embodiment is mounted in a vehicle M and performs steering control of the vehicle M. It is assumed that the steering control by the steering control device 1 includes motion control of the vehicle M, such as load distribution control for the front and rear wheels or posture control of the vehicle M, starting with steering control of wheels.

As shown in FIGS. 1 and 2, the steering control device 1 includes an operating unit 18 which is operated by a driver, a control unit 10 which performs steering control of the vehicle M on the basis of an input value input by the operation of the operating unit 18, and a vehicle steering mechanism 21 which is controlled by the control unit 10 to perform the steering of the vehicle M.

The operating unit 18 includes a steering shaft 19 whose lower end is connected to the vehicle steering mechanism 21, and a steering wheel 20 which is connected to the upper end of the steering shaft 19. The steering wheel 20 is supported by the steering shaft 19 through, for example, a universal joint or the like, and is configured to rotate in a plurality of directions described below around the support point by the steering shaft 19. That is, the steering wheel 20 can be steered through a plurality of different motions, and can perform a plurality of inputs in accordance with the motions.

Specifically, the steering wheel 20 can rotate around a shaft line LS of the steering shaft 19. In the following description, this motion is called the rotation of the steering wheel 20. That is, the steering wheel 20 can be operated in a rotation direction m1 by rotation. The rotational operation is the operation to steer the wheels of the vehicle M, and corresponds to a main operation in the steering control device 1.

The steering wheel 20 can rotate around an axis LR perpendicular to the shaft line LS of the steering shaft 19 in the up-down direction. In the following description, this motion is called the swing of the steering wheel 20. The steering wheel 20 can advance and retreat in the extension direction of the shaft line LS of the steering shaft 19. In the following description, this motion is called the push-pull of the steering wheel 20. The steering wheel 20 can rotation around an axis LD perpendicular to the shaft line LS of the steering shaft 19 in the vehicle width direction. In the following description, this motion is called the tilt of the steering wheel 20.

That is, the steering wheel 20 can be operated in a swing direction m2 by swing, can be operated in a push-pull direction m3 by push-pull, and can be operated in a tilt direction m4 by tilt. The swing operation, the push-pull operation, and the tilt operation are operations for controlling the motion of the vehicle M separately from the steering of the vehicle, and corresponds to a sub operation in the steering control device 1. With the swing operation, the push-pull operation, and the tilt operation, the wheels of the vehicle M may be steered. In the following description, a sub operation will be described focusing on the swing operation and the push-pull operation. In this embodiment, it is assumed that motions in which only the directions of the left and right or the directions of the front and back are different are included in one motion. For example, the motion of rotating the steering wheel 20 right and the motion of rotating the steering wheel 20 left are included in one motion.

The vehicle steering mechanism 21 is a so-called steer-by-wire steering mechanism which is linked to the wheels of the vehicle M and connected to the control unit 10, and can steer the vehicle M by steering control of the control unit 10 based on a plurality of inputs from the steering wheel 20. As a specific example of the steering of the vehicle M, there are the load distribution control of the front and rear wheels, the posture control of the vehicle M, and the like, by control of the suspension or the brake, starting from the steering of the wheels. That is, the vehicle steering mechanism 21 performs so-called active steering under the control of the control unit 10.

The steering control device 1 also include a reactive actuator 22 which is linked to the steering wheel 20 to give a reactive force to the operation of the steering wheel 20, and a display 23 which is provided in the interior of the vehicle M to display information relating to the driving of the vehicle M. The reactive actuator 22 includes, for example, a motor, a hydraulic device, and the like, and gives torque to the steering wheel 20. The display 23 is, for example, an in-vehicle display which is commonly used in a navigation system or the like, or a display of a meter. The reactive actuator 22 and the display 23 are connected to the control unit 10, and applies the reactive force and display information under the control of the control unit 10 based on a plurality of inputs from the steering wheel 20.

The steering control device 1 has a plurality of sensor. Specifically, the steering control device 1 has a vehicle speed sensor 2 which is attached in the vicinity of the wheels of the vehicle M to detect the vehicle speed, a yaw rate sensor 3 which is attached to a portion of the vehicle M to detect the yaw rate of the vehicle M, and a lateral G sensor 4 which is attached to a portion of the vehicle M to detect the lateral G of the vehicle M.

The steering control device 1 also has a steering angle sensor 5 which is attached in the vicinity of the steering shaft 19 to detect the steering angle of the rotational operation, a swing angle sensor 6 which is attached in the vicinity of the steering wheel 20 to detect the swing angle of the swing operation, and a stroke sensor 7 which is attached in the vicinity of the steering shaft 19 to detect the stroke of the push-pull operation.

These sensors 2 to 7 are connected to the control unit 10 and output information representing the detection values to the control unit 10. Hereinafter, information output from the vehicle speed sensor 2, the yaw rate sensor 3, and the lateral G sensor 4 is collectively referred to as traveling information. Information output from the steering angle sensor 5, the swing angle sensor 6, and the stroke sensor 7 is collectively referred to as operation information.

Subsequently, the configuration of the control unit 10 will be described. The control unit 10 is an electronic control unit which performs overall control of the steering control device 1. The control unit 10 is primarily constituted by a CPU, and includes a ROM, a RAM, an input signal circuit, an output signal circuit, a power circuit, and the like. In FIG. 1, wirings which are connected to the control unit 10 are omitted.

The control unit 10 performs steering control of the vehicle M on the basis of the traveling information and the operation information output from the sensors 2 to 7, and has a function of adjusting the neutral point (reference point) of each detection value represented by the operation information. Specifically, the control unit 10 adjusts the neutral point of each of the rotational motion, the swing motion, and the push-pull motion by the steering wheel 20. The adjustment of the neutral point includes, for example, the initial setting (initialization) of the neutral point at the time of factory shipment or the like, the setting (resetting) or the update of the neutral point when the vehicle M is in use after factory shipment. Hereinafter, the neutral point is also referred to as "N point", and the adjustment of the N point is also referred to as "learning". The N point has the same meaning as so-called "0 point (zero point)".

As shown in FIG. 2, the control unit 10 includes an information acquisition unit 11, a steering control unit 12, a learning control unit 13, a straight state determination unit (traveling state determination unit) 14, and an N-point learning unit (reference point adjustment unit) 15. These may be constituted as programs which are executed by the steering control device 1 or may be constituted by units which are provided individually.

The information acquisition unit 11 has a function of acquiring the traveling information and the operation information output from the sensors 2 to 7. Specifically, the information acquisition unit 11 acquires the traveling information output from the vehicle speed sensor 2, the yaw rate sensor 3, and the lateral G sensor 4, and stores the detection values represented by the acquired traveling information along with the detection time. The information acquisition unit 11 acquires the operation information output from the steering angle sensor 5, the swing angle sensor 6, and the stroke sensor 7, and stores the detection values represented by the acquired operation information along with the detection time. The information acquisition unit 11 outputs the stored detection values and the detection time for processing in the learning control unit 13, the straight state determination unit 14, or the N-point learning unit 15.

The detection values included in the traveling information and the operation information acquired by the information acquisition unit 11 corresponds to input values which are input to the control unit 10. That is, the steering angle, the swing angle, and the stroke represented by steering angle information, swing angle information, and stroke information correspond to input values which are input by the rotational motion, the swing motion, and the push-pull motion of the steering wheel 20. The detection values of the yaw rate and the lateral G included in the traveling information are, for example, positive in the right direction and negative in the left direction.

The steering control unit 12 has a function of acquiring the input values input by the motions in the steering wheel 20 from the information acquisition unit 11 and performing steering angle of the vehicle M through a plurality of operation systems corresponding to the motions on the basis of the acquired input values. That is, the steering control unit 12 calculates the control amount on the basis of an operating amount in each operation system of the rotational operation, the swing operation, and the push-pull operation of the steering wheel 20, and controls active steering by the vehicle steering mechanism 21 in accordance with the calculated control amount.

The operating amount used herein is the displacement from each input value of the steering angle, the swing angle, and the stroke from the N point. The steering control unit 12 acquires the N point updated by learning (the details will be described) in the N-point learning unit 15 from the N-point learning unit 15, and calculates each operating amount on the basis of the N point acquired from the N-point learning unit 15 and each input value acquired from the information acquisition unit 11. The steering control unit 12 outputs each calculated operating amount for processing in the learning control unit 13, the straight state determination unit 14, or the N-point learning unit 15. In the case of the steering angle or the swing angle, each operating amount calculated by the steering control unit 12 is positive in the right direction and negative in the left direction on the basis of the N point. In the case of the stroke, the operating amount is, for example, positive in the push direction (the direction away from the driver) and negative in the pull direction (the direction close to the driver) with the N point as reference.

The learning control unit 13 has a function of controlling N-point learning in the control unit 10. The learning control unit 13 selects an operation system (hereinafter, also referred to as "target") as a target for N-point learning from among the operation systems of the rotational operation, the swing operation, and the push-pull operation. The learning control unit 13 determines whether or not the absolute value of the operating amount in each operation system other than the target from among the operation systems of the rotational operation, the swing operation, and the push-pull operation is smaller than a predetermined operating amount threshold value. The learning control unit 13 determines whether or not N-point learning by the N-point learning unit 15 or the like ends.

The learning control unit 13 selects at least one operation system from among the operation systems of the rotational operation, the swing operation, and the push-pull operation as a target. That is, the target may be one or multiple.

The straight state determination unit 14 has a function of determining whether or not the vehicle M is in a straight state (reference traveling state). The straight state determination unit 14 determines whether or not the vehicle speed of the vehicle M acquired by the information acquisition unit 11 is greater than a predetermined vehicle speed threshold value. The straight state determination unit 14 determines whether or not the absolute value of each detection value which is represented by the traveling information acquired by the information acquisition unit 11 is continuously smaller than a predetermined threshold value for a given time. Specifically, the straight state determination unit 14 determines whether or not the absolute value of the yaw rate of the vehicle M output from the information acquisition unit 11 is continuously smaller than a yaw rate threshold value for a given time. The straight state determination unit 14 determines whether or not the absolute value of the lateral G of the vehicle M output from the information acquisition unit 11 is continuously smaller than a lateral G threshold value for a given time.

When both the absolute value of the yaw rate and the absolute value of the lateral G are continuously smaller than the threshold values for the given time, the straight state determination unit 14 determines that the vehicle M is in the straight state. Although the straight state (the state where the yaw rate is 0 and the lateral G is 0) is the reference traveling state, a state where the yaw rate or the lateral G has a predetermined value (for example, a state where a vehicle is traveling on a curve at a given speed) may be the reference traveling state. In this case, the straight state determination unit 14 calculates the differential value of an actual yaw rate or lateral G relative to a reference yaw rate or a reference lateral G, and determines whether or not the absolute value of the calculated differential value is continuously smaller than a predetermined threshold value for a given time. In this way, the straight state determination unit 14 calculates the differential value of the traveling state of the vehicle relative to a reference traveling state, and when the absolute value of the calculated differential value is continuously smaller than a predetermined threshold value for a given time, determines that the vehicle is in the reference traveling state.

The N-point learning unit 15 has a function of performing N-point learning in the target when the straight state determination unit 14 determines that the vehicle M is in the straight state. Specifically, the N-point learning unit 15 acquires the operating amount of the target from the steering control unit 12 when it is determined that the vehicle M is in the straight state (when the given time has elapsed), and stores (updates) the operating amount as the N point. That is, the N-point learning unit 15 overwrites the last N point before N-point learning, and stores the newly acquired operating amount as the N point. The N-point learning unit 15 acquires the yaw rate and the lateral G from the information acquisition unit 11 when it is determined that the vehicle M is in the straight state. The N-point learning unit 15 outputs the updated N point for controlling steering control of the vehicle M in the steering control unit 12.

Figure 3:
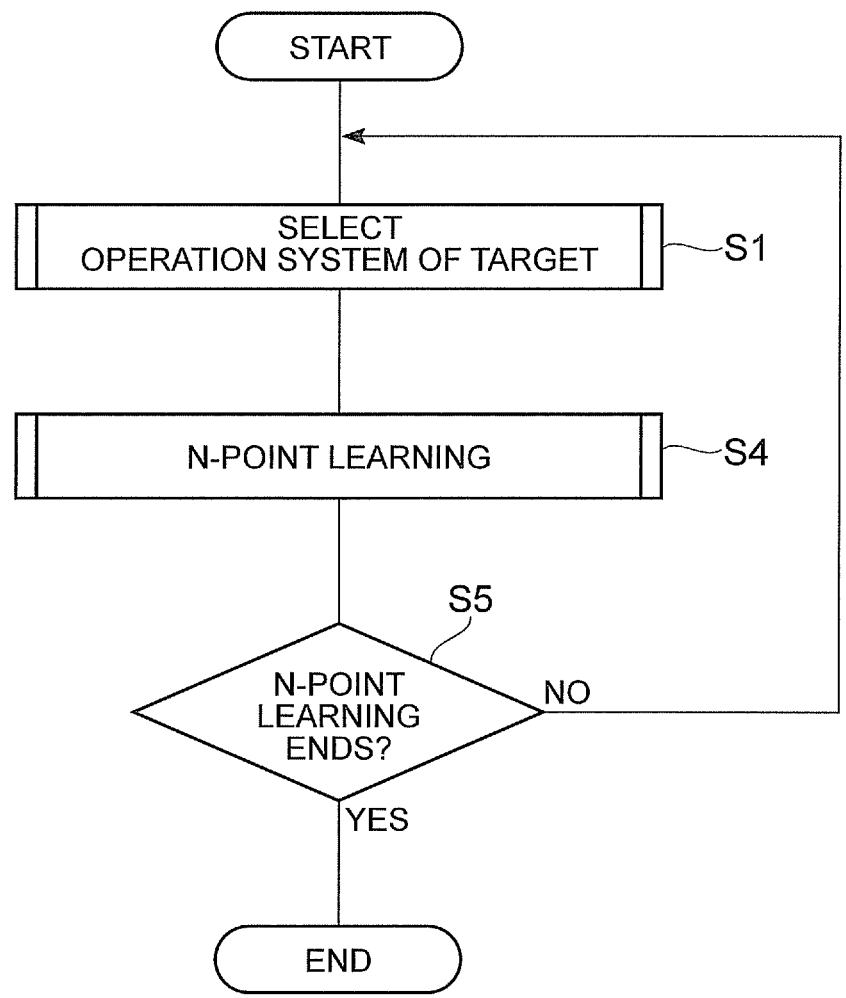
FIG. 3 is a flowchart showing a procedure in the steering control device of FIG. 2.
Figure 4:
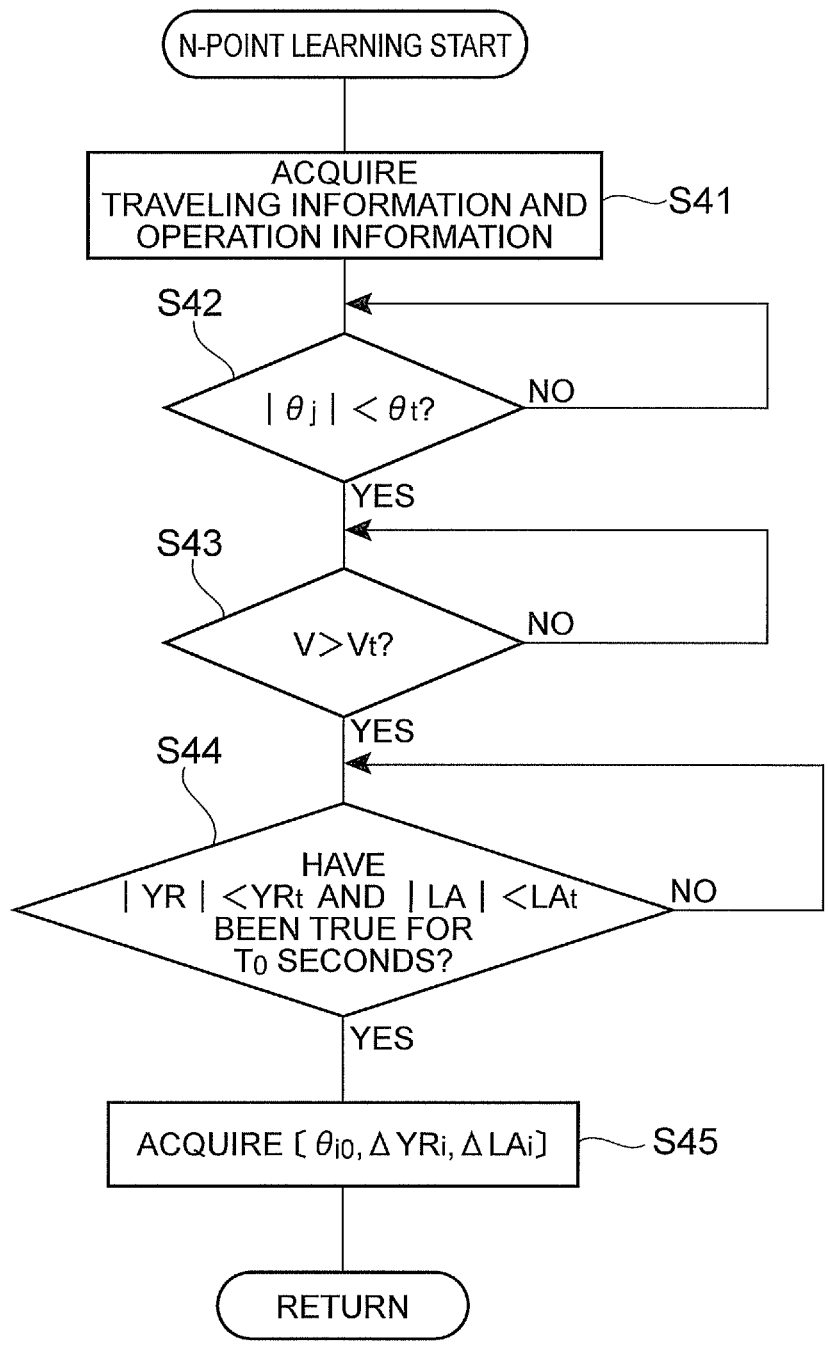
FIG. 4 is a flowchart showing a procedure of an N-point learning process in FIG. 3.

Subsequently, the operation of the steering control device 1 configured as above will be described. The following description will be provided focusing on N-point learning in a plurality of operation systems by the control unit 10. FIG. 3 is a flowchart showing a procedure in the steering control device 1. FIG. 4 is a flowchart showing a procedure of an N-point learning process in FIG. 3. The process in FIG. 3 is repeatedly executed by the control unit 10 in a predetermined cycle.

First, an operation system of a target is selected by the learning control unit 13 (S1). The learning control unit 13 may select only the rotational operation, which is the main operation, as the target, or may select the rotational operation as well as the swing operation or the push-pull operation, which is the sub operation, as the target.

Next, N-point learning is performed in the operation system of the target (S4). The process during N-point learning is executed in accordance with the procedure shown in FIG. 4. When the target is multiple, while N-point learning is performed in one target, N-point learning is not performed in another target. That is, the N-point learning process shown in FIG. 4 is performed for each operation system in a predetermined sequence. In the control unit 10 of this embodiment, it is desirable that N-point learning is initially performed in the rotational operation.

First, the traveling information and the operation information output from the sensors 2 to 7 are acquired by the information acquisition unit 11 (Step S41 of FIG. 4). The information acquisition unit 11 stores and outputs the detection values and the detection time. The operating amount and the control amount in each operation system are calculated by the steering control unit 12. The acquisition process or calculation process is repeatedly executed in a cycle shorter than a cycle in which the overall process shown in FIG. 3 is executed.

Next, the learning control unit 13 determines whether or not the absolute value |θj| of the operating amount in at least one operation system from among the operation systems other than the target is smaller than a predetermined operating amount threshold value θt (S42). When it is determined in Step S42 that the absolute value of the operating amount θj is equal to or greater than the operating amount threshold value θt (|θj|≥θt), the same process is repeated. The operating amount threshold value θt which is used in Step S42 may be substantially 0. If the operating amount threshold value θt is substantially 0, it is possible to determine when the input system in an operation system other than the target is substantially 0. That is, it is possible to determine that the motion position of the steering wheel 20 in an operation system other than the target is substantially at the reference position (neutral position). An operation system where it is determined whether or not the absolute value |θj| of the operating amount is smaller than the operating amount threshold value θt may be a plurality of operation systems from among the operation systems other than the target, or may be one operation system.

When it is determined in Step S42 that the absolute value of the operating amount θj is smaller than the operating amount threshold value θt (|θj|<θt), the straight state determination unit 14 determines whether or not the vehicle speed V of the vehicle M is greater than a predetermined vehicle speed threshold value Vt (S43). That is, through Step S43, it is determined whether or not the vehicle M reaches a predetermined speed. When it is determined in Step S43 that the vehicle speed V of the vehicle M is equal to or smaller than the vehicle speed threshold value Vt (V≤Vt), the same process is repeated.

When it is determined in Step S43 that the vehicle speed V of the vehicle M is greater than the vehicle speed threshold value Vt (V>Vt), the straight state determination unit 14 determines whether or not the absolute value |YR| of the yaw rate of the vehicle M is continuously smaller than a yaw rate threshold value YRt for a given time $T_0$, and the absolute value |LA| of the lateral G is continuously smaller than a lateral G threshold value LAt for the given time $T_0$ (S44). That is, through Step S44, it is determined whether or not the vehicle M is in the straight state. When the absolute value |YR| of the yaw rate is equal to or greater than the yaw rate threshold value YRt (|YR|≥YRt) or the absolute value |LA| of the lateral G is equal to or greater than the lateral G threshold value LAt (|LA|≥LAt) within the given time $T_0$, the same process is repeated.

When it is determined in Step S44 that the absolute value |YR| of the yaw rate of the vehicle M is continuously smaller than the yaw rate threshold value YRt for the given time $T_0$, and the absolute value |LA| of the lateral G is continuously smaller than the lateral G threshold value LAt for the given time $T_0$, the operating amount θi0 of the target when the given time $T_0$ has elapsed and the yaw rate ΔYRi and the lateral G ΔLAi at this time are acquired by the N-point learning unit 15 (S45). That is, through Step S45, N-point learning is performed. The yaw rate ΔYRi and the lateral G ΔLAi mean errors at the time of N point acquisition (at the time of reference point adjustment). The N-point learning unit 15 updates the N point and outputs the updated N point to the steering control unit 12. In the steering control unit 12, steering control of the vehicle M is performed using the N point output from the N-point learning unit 15.

Through Steps S42 to S44, when learning the N point in the operation system of the target, the N-point learning unit 15 performs N-point learning under the condition that the operating amount θj in at least one operation system from among the operation systems other than the target is the operating amount threshold value θt.

Next, the learning control unit 13 determines whether or not N-point learning in Step S4 ends in all targets (Step S5 of FIG. 3). When it is determined in Step S5 that N-point learning does not end, the process returns to Step S1. When it is determined in Step S5 that N-point learning ends, the process by the control unit 10 ends.

FIG. 5 is an explanatory view of N-point learning in the N-point learning process (Steps S41 to S45 of FIG. 4). In the examples of FIGS. 5(a) and 5(b), the absolute value |YR| of the yaw rate of the vehicle M is continuously smaller than the yaw rate threshold value YRt, and the absolute value |LA| of the lateral G is continuously smaller than the lateral G threshold value LAt for the given time $T_0$ seconds. Accordingly, as shown in FIG. 5(c), the operating amount θi0 when the given time $T_0$ has elapsed becomes the N point which is newly updated.

With this sequence of processes, N-point learning of the target by the control unit 10 is performed.

In the related art, in a vehicle which has a steering to be steered through a plurality of motions, N-point learning of each operation system is performed alone. In this case, an error of the N point in each operation system is accumulated, and even though the operation system returns to the N point, vehicle deflection or the like occurs, causing a sense of discomfort. Whenever N-point learning is performed, the precision may change, and compatible steering control may not be stably performed.

According to the steering control device 1 of this embodiment, the control unit 10 performs N-point learning under the condition that the operating amount θj in an operation system other than the target is smaller than the predetermined value θt (or substantially 0). Accordingly, it is possible to suppress the influence of an operation system other than the target on the steering of the vehicle M during N-point learning. Therefore, it is possible to learn the N point in an operation system other than the target with high precision. N-point learning is performed in each target, such that, even in the operating unit 18 (see FIG. 1) which can be steered through a plurality of motions, it is possible to learn the N point of each motion with high precision.

Since N-point learning is not performed simultaneously in one operation system from among a plurality of operation systems and another operation system, N point errors in each operation system are substantially constant, thereby reducing variations in the learning precision of the operation systems.

Second Embodiment

Figure 6:
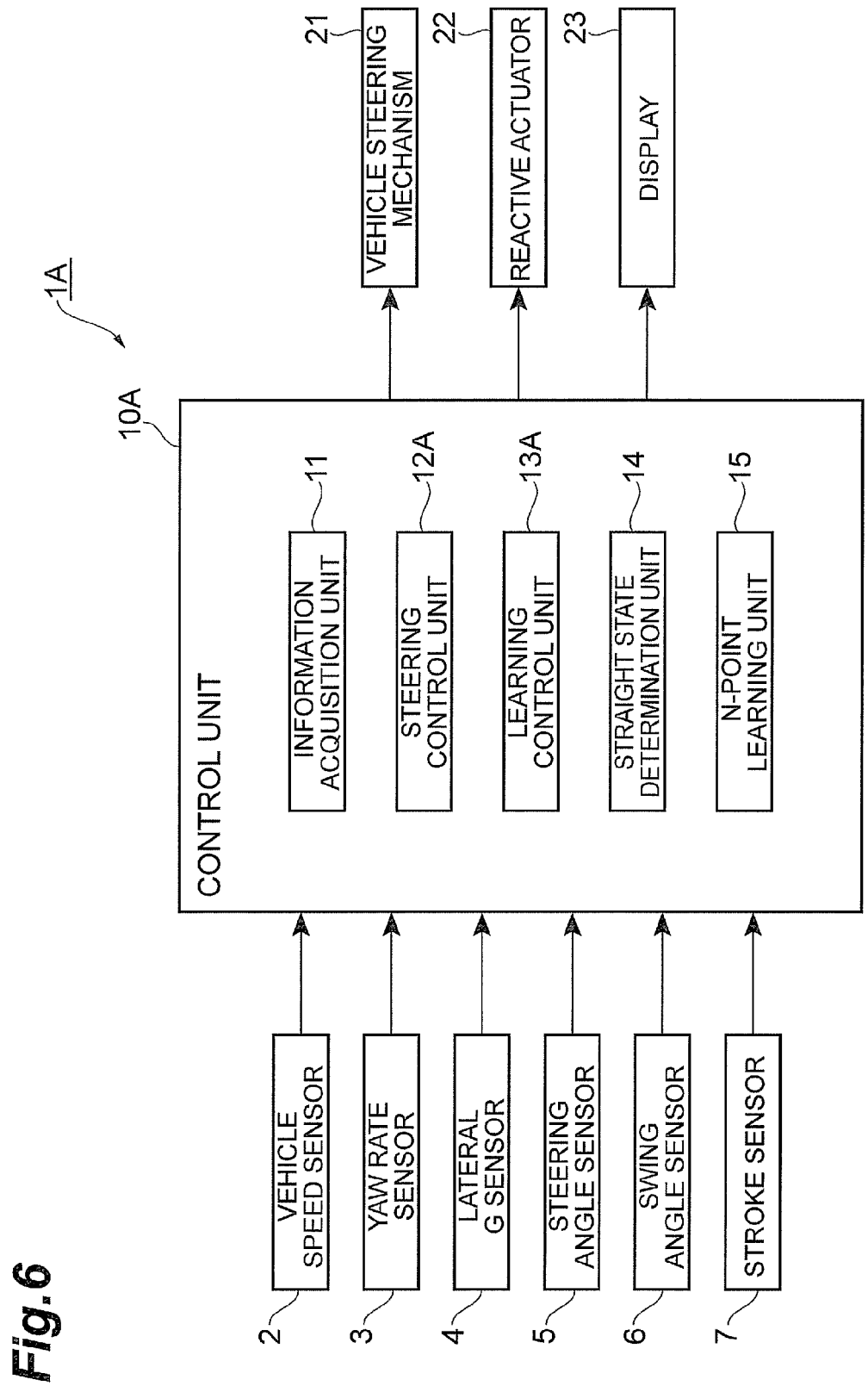
FIG. 6 is a block diagram showing a steering control device according to a second embodiment.

FIG. 6 is a block diagram showing a steering control device according to a second embodiment. A control unit 10A of a steering control device 1A of this embodiment shown in FIG. 6 is different from the control unit 10 shown in FIG. 2 in that a steering control unit 12A which reduces the control amount in a sub operation system other than the target is substituted for the steering control unit 12, and a learning control unit 13A which stores the target sequence in advance is substituted for the learning control unit 13.

Similarly to the steering control unit 12, the steering control unit 12A has a function of calculating the control amount on the basis of the operating amount in each operation system of the rotational operation, the swing operation, and the push-pull operation of the steering wheel 20 and performing steering control of the vehicle M in accordance with the calculated control amount. When N-point learning of the target is performed, the steering control unit 12A of this embodiment reduces the control amount (gain) in an operation system other than the target.

The reduction of the control amount by the steering control unit 12A may be made by multiplying a predetermined reduction coefficient, for example, smaller than 1, or the control amount may be 0. If the control amount is 0, even if the driver operates an operation system other than the target, steering control corresponding to the operation is not performed. In order that a motion corresponding to an operation system other than the target is impossible, the steering control unit 12A may control the reactive actuator 22 such that the steering wheel 20 is fixed and no input is made. Hereinafter, the above-described reduction of the control amount is collectively referred to as "operation restriction".

If N-point learning by the learning control unit 13A ends, the steering control unit 12A releases operation restriction in an operation system other than the target. That is, if N-point learning by the learning control unit 13A ends, the steering control unit 12A calculates the control amount on the basis of the operating amount in each operation system of the rotational operation, the swing operation, and the push-pull operation of the steering wheel 20, and performs steering control of the vehicle M in accordance with the calculated control amount.

The learning control unit 13A has a function of controlling N-point learning in the control unit 10A. The learning control unit 13A of this embodiment stores an operation system as a target and the sequence, in which N-point learning is performed, for the operation systems other than the target. The learning control unit 13A may set only the rotational operation, which is the main operation, as the target, or may set the swing operation or the push-pull operation, which is the sub operation subsequent to the rotational operation, as the target. For example, as shown in Step S11 of FIG. 8, the learning control unit 13A sets a rotational operation system as a first target and sets a swing operation system as a second target. Accordingly, N-point adjustment of each operation system in the control unit 10A is performed in a prescribed sequence. According to the target sequence stored in the learning control unit 13A, the rotational operation which is the main operation has a first sequence. The learning control unit 13A sets a higher sequence (earlier sequence) to an operation system which significantly affects errors during steering control of the vehicle M. In other words, the learning control unit 13A sets a higher sequence to an operation system in which the sensitivity of the driver to errors is high.

While the above-described operation restriction by the steering control unit 12A is made, the learning control unit 13A controls the display 23 such that a warning message is displayed on the display 23. The warning message which is displayed and controlled by the learning control unit 13A is, for example, "during swing operation (or push-pull operation) restriction", "swing operation (or push-pull operation) is currently disabled", or the like. If the operation restriction is released by the steering control unit 12A, the learning control unit 13A controls the display 23 such that the display of the warning message ends.

Figure 7:
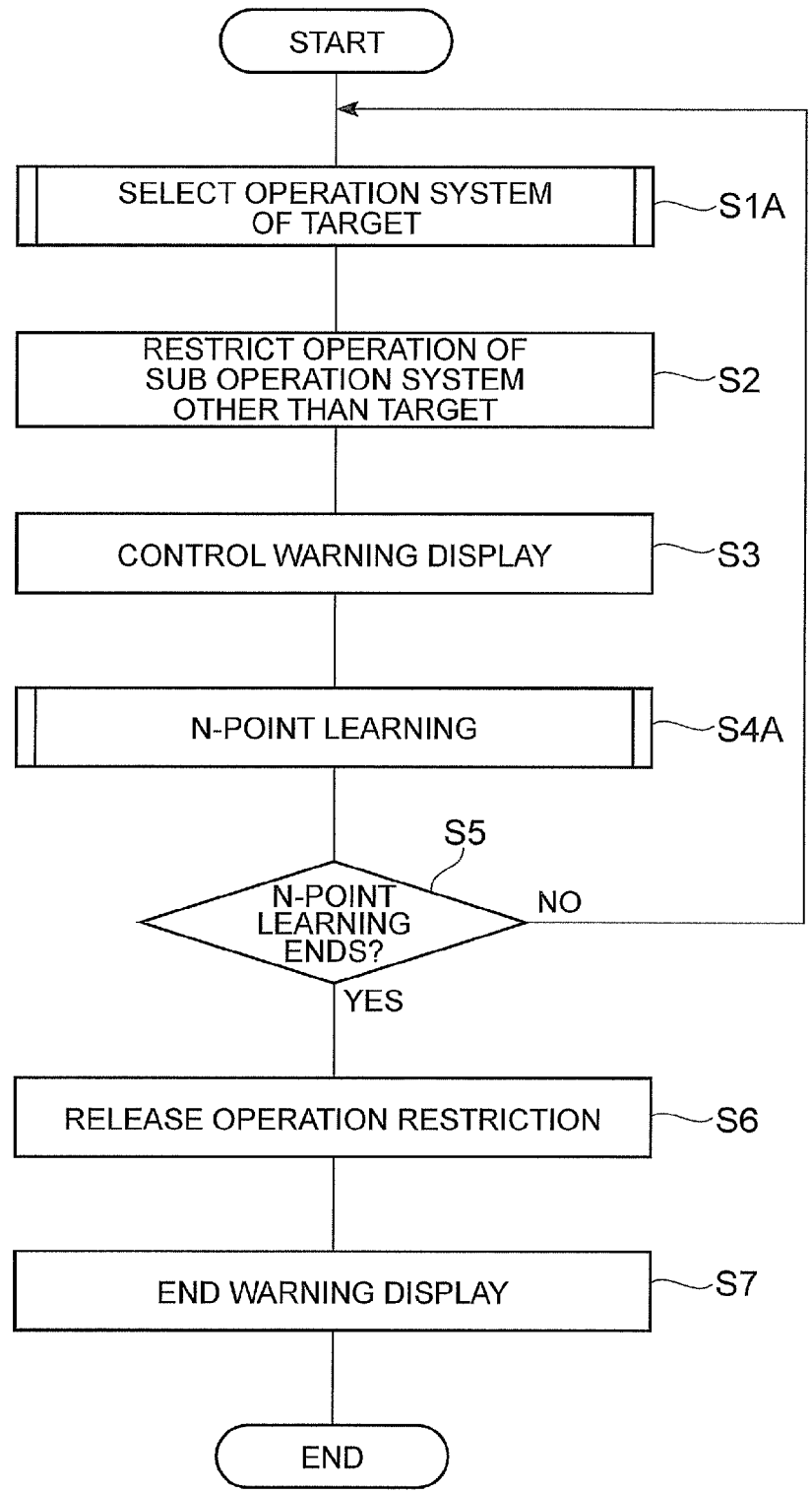
FIG. 7 is a flowchart showing a procedure in the steering control device of FIG. 6.
Figure 8:
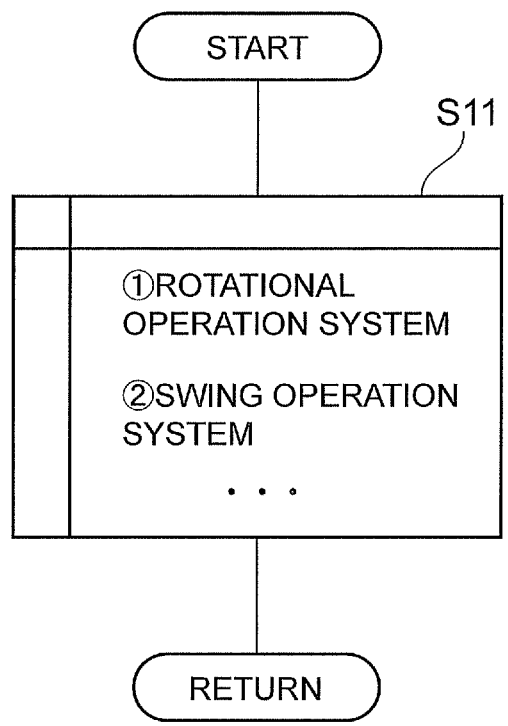
FIG. 8 is a flowchart showing a procedure of a target selection process in FIG. 7.
Figure 9:
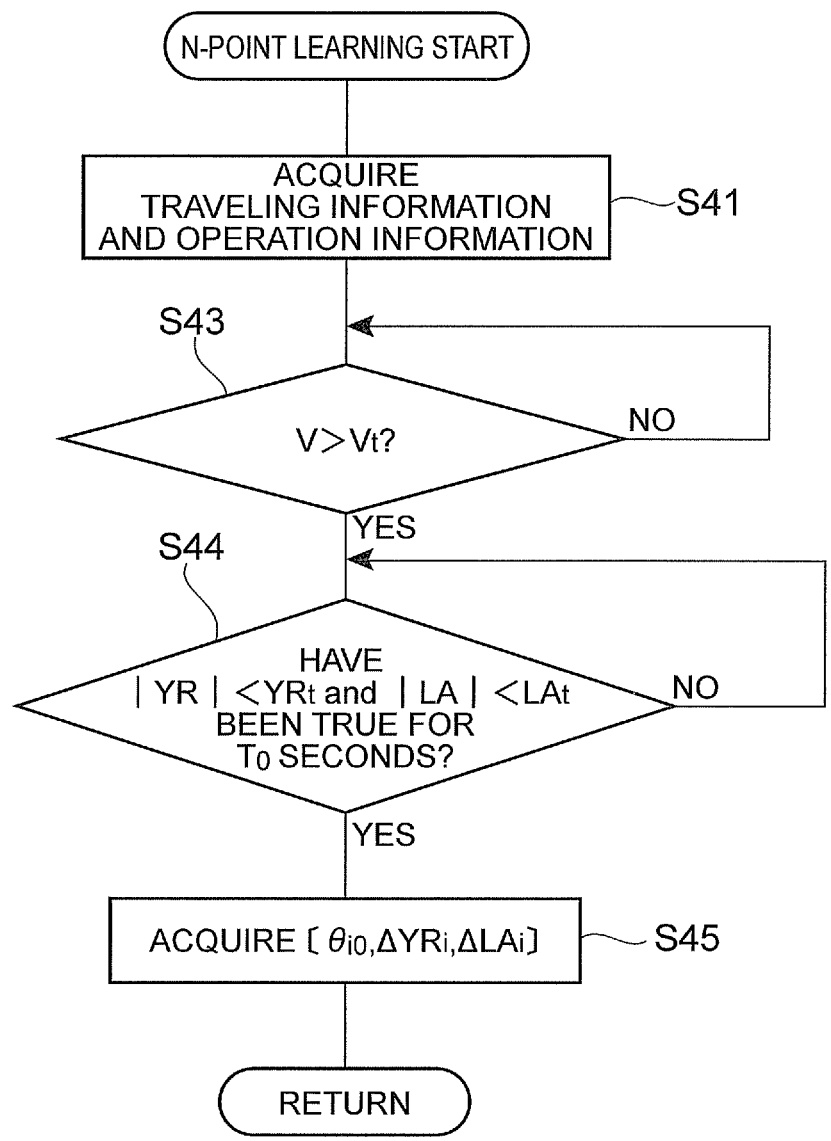
FIG. 9 is a flowchart showing a procedure of an N-point learning process in FIG. 7.

Subsequently, the operation of the steering control device 1A configured as above will be described. FIG. 7 is a flowchart showing a procedure in the steering control device 1A. FIG. 8 is a flowchart showing a procedure of a target selection process in FIG. 7. FIG. 9 is a flowchart showing a procedure of an N-point learning process in FIG. 7. The process in FIG. 7 is repeatedly executed by the control unit 10A in a predetermined cycle.

First, the learning control unit 13A selects the operation system of the target (S1A). As shown in FIG. 8, the operation system of the target is selected in accordance with the target sequence stored in the learning control unit 13A in advance. N-point learning is initially performed in the rotational operation which is the main operation.

Next, operation restriction is made by the steering control unit 12A in an operation system other than the target (S2). An operation system in which the operation restriction is made in Step S2 may be one operation system in which N-point learning is performed, or may be a plurality of operation systems. For example, while N-point learning is being performed in the rotational operation system, it is possible to make operation restriction in the swing operation system (next target) in which N-point learning is next performed or an operation system in which N-point learning is not performed (other than the target).

Next, the learning control unit 13A performs control such that the warning message is displayed on the display 23 (S3).

Next, N-point learning is sequentially performed in the operation system of the target (S4A). The process during N-point learning is executed in accordance with the procedure shown in FIG. 9. The N-point learning process shown in FIG. 9 is different from the N-point learning process shown in FIG. 4 in that there is no Step S42 in which it is determined whether or not the absolute value |θj| of the operating amount in an operation system other than the target is smaller than a predetermined operating amount threshold value θt.

Next, the learning control unit 13A determines whether or not N-point learning ends for all targets in Step S4A (Step S5 of FIG. 7). When it is determined in Step S5 that N-point learning does not end, the process returns to Step S1A.

When it is determined in Step S5 that N-point learning ends, the operation restriction is released by the steering control unit 12A (S6). The learning control unit 13A controls the display 23 such that the display of the warning message ends (S7). With this sequence of processes, N-point learning of the target by the control unit 10A is performed.

According to the steering control device 1A of this embodiment, when N-point learning is performed by the control unit 10A, the control amount in an operation system other than the target in which N-point learning is performed is reduced, thereby reducing the influence of an operation system other than the target, in which N-point learning is performed, on the steering of the vehicle M. Therefore, it is possible to learn the N point in the operation system of the target with high precision. N-point learning is performed in each target, such that even in the operating unit 18 (see FIG. 1) which can be steered through a plurality of motions, it is possible to learn the N point of each motion with high precision.

N-point learning of the motions in a plurality of operation systems is performed in a prescribed sequence. Therefore, there is no case where N-point learning is not performed simultaneously in different operation systems, and N point errors in each operation system are substantially constant, thereby reducing variations in the precision of the operation systems.

The N point of the rotational motion of the steering wheel from among a plurality of motions in the operating unit 18 is initially adjusted. Therefore, even if the N point of a motion (swing or push-pull) other than the rotational motion has an error and is adjusted, since the N point of the rotational motion is already adjusted, it is possible to prevent the influence of the N point errors of the rotational motion.

Third Embodiment

Figure 10:
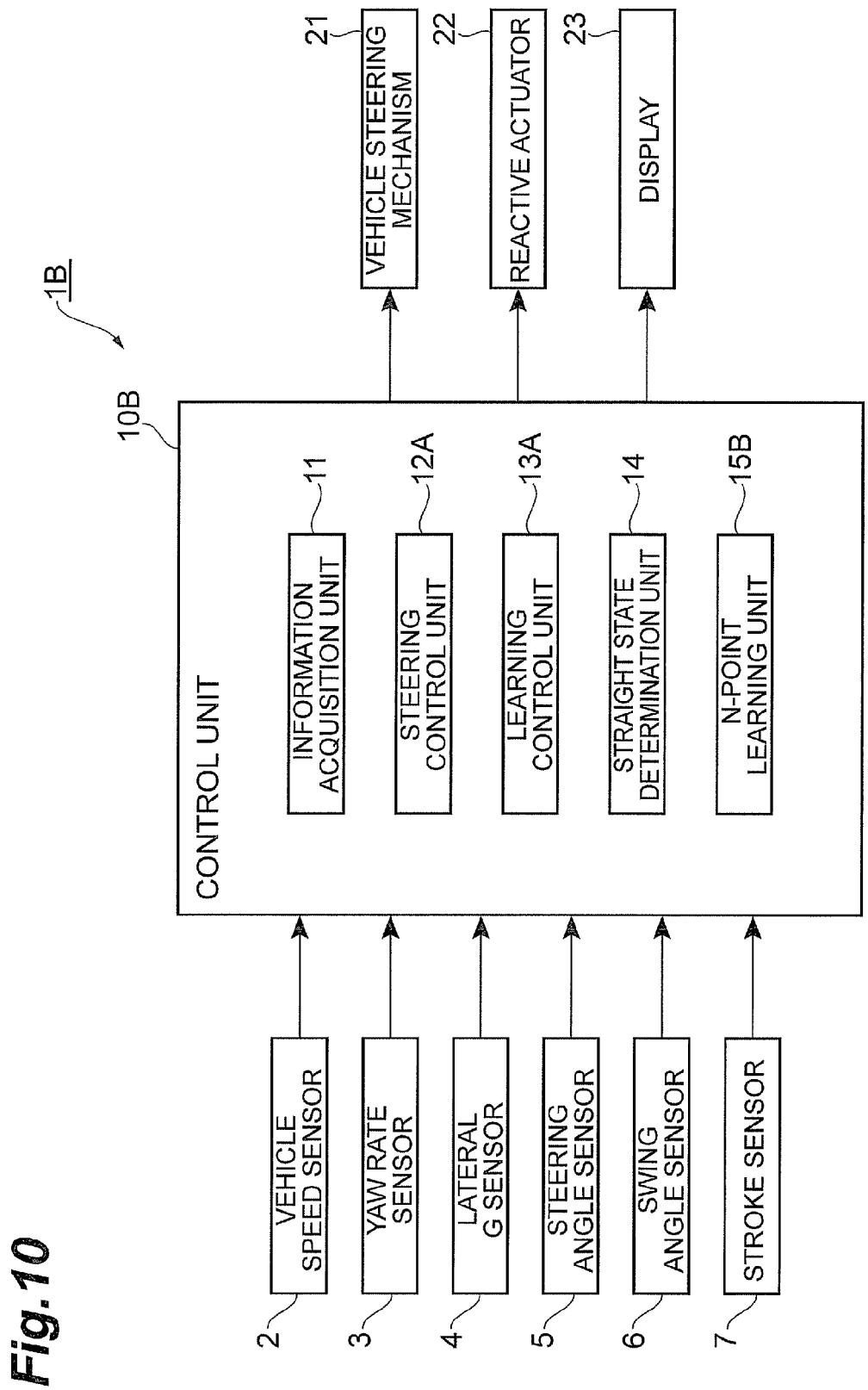
FIG. 10 is a block diagram showing a steering control device according to a third embodiment.

FIG. 10 is a block diagram showing a steering control device according to a third embodiment. A control unit 10B of a steering control device 1B of this embodiment shown in FIG. 10 is different from the control unit 10A of the second embodiment shown in FIG. 6 in that an N-point learning unit (reference point adjustment unit) 15B which equalizes the error distribution of the traveling state at the time of N point acquisition in each operation system of the target is substituted for the N-point learning unit 15.

Similarly to the N-point learning unit 15, the N-point learning unit 15B has a function of learning the N point in the target when the straight state determination unit 14 determines that the vehicle M is in the straight state. The N-point learning unit 15B of this embodiment performs N-point learning such that the absolute value of a value (hereinafter, referred to as "N-point error total value") obtained by totaling errors at the time of N point acquisition in each operation system as the target is smaller than a given value. Specifically, the N-point learning unit 15B determines the positive/negative of the yaw rate ΔYRi and the lateral G ΔLAi at the time of N point acquisition in each operation system. Accordingly, in the coordinate system where the horizontal axis is the yaw rate and the vertical axis is the lateral G, a quadrant (first quadrant to fourth quadrant; see FIG. 12) where an error is located in each operation system is determined. Hereinafter, this determination is referred to as N-point error region determination. The N-point learning unit 15B performs N-point learning such that errors in each operation system are distributed evenly in the quadrants. Hereinafter, this process is referred to as quadrant restriction.

Figure 11:
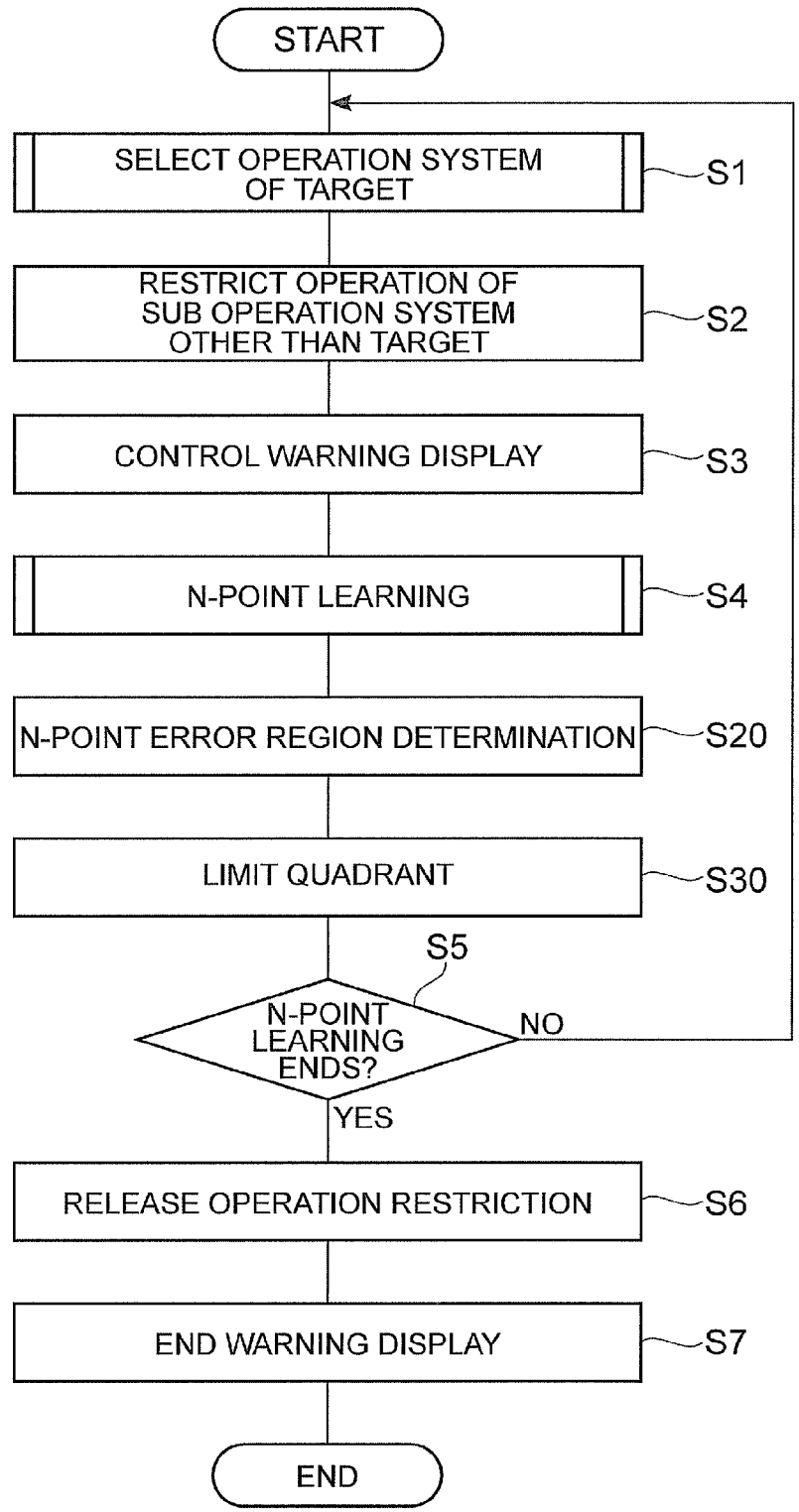
FIG. 11 is a flowchart showing a procedure in the steering control device of FIG. 10.

Subsequently, the operation of the steering control device 1B configured as above will be described. FIG. 11 is a flowchart showing a procedure in the steering control device 1B. The process in FIG. 11 is repeatedly executed by the control unit 10B in a predetermined cycle.

The process by the control unit 10B shown in FIG. 11 is different from the process by the control unit 10A shown in FIG. 7 in that Step S20 in which N-point error region determination is performed is provided after N-point learning of Step S4, and Step S30 in which quadrant restriction is made is provided after Step S20.

Figure 12:
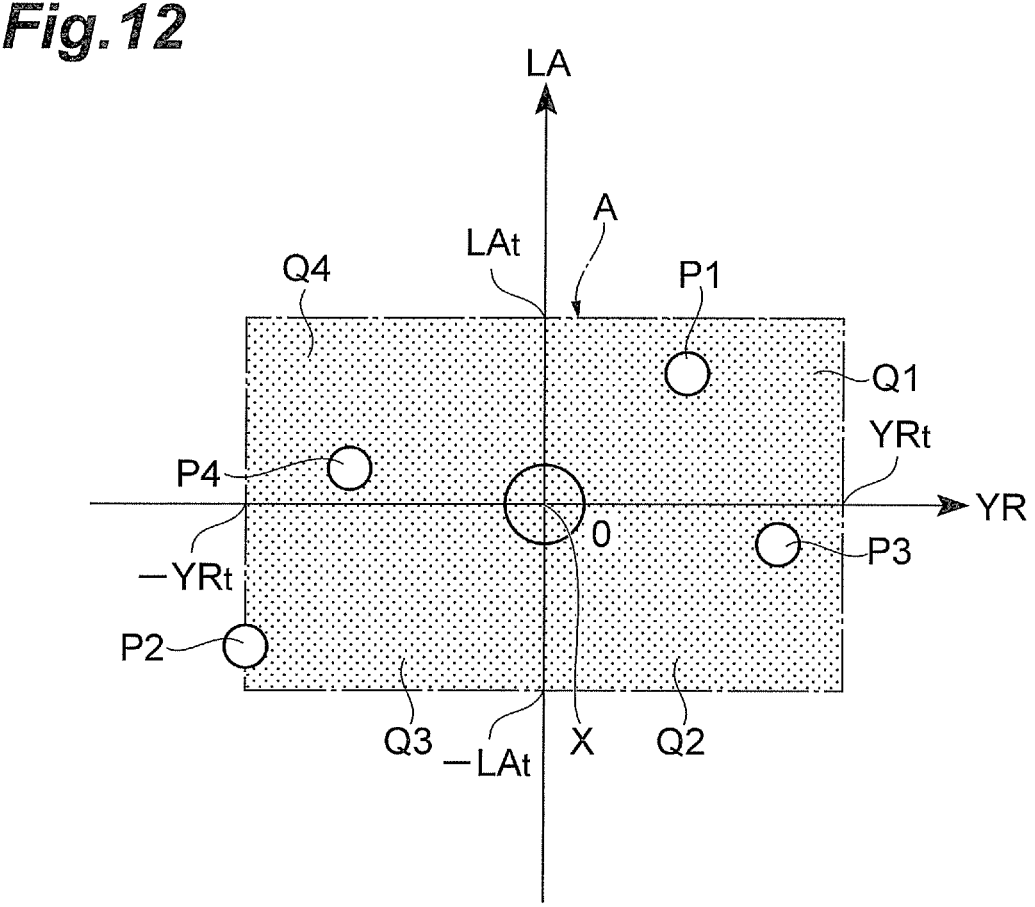
FIG. 12 is a diagram showing an example of N-point error region determination and quadrant restriction.

In Step S20, the N-point learning unit 15B determines the positive/negative of the yaw rate ΔYRi and the lateral G ΔLAi at the time of N point acquisition in each operation system of the target. For example, when both the yaw rate ΔYRi and the lateral G ΔLAi are positive, as indicated at a point P1 in the example of FIG. 12, it is determined that an error in this operation system is located in the first quadrant Q1. When the yaw rate ΔYRi is negative and the lateral G ΔLAi is positive, as indicated at a point P4 in the example of FIG. 12, it is determined that an error in this operation system is located in the fourth quadrant Q4. The quadrants Q1 to Q4 in FIG. 12 are the regions which are defined by the yaw rate threshold value YRt and the lateral G threshold value LAt.

Next, in Step S30, the N-point learning unit 15B performs N-point learning such that errors in each operation system are distributed evenly in the quadrants. That is, as in the example of FIG. 12, when there are four sub operation systems, N-point learning is performed such that sub operation system errors P1, P2, P3, and P4 are respectively located in the first quadrant Q1, the third quadrant Q3, the second quadrant Q2, and the fourth quadrant Q4. The origin X of the coordinate system shown in FIG. 12 corresponds to the N point X (that is, the straight state) of the traveling state of the vehicle M.

In other words, in Step S30, N-point learning is performed such that the absolute value of the N-point error total value is smaller than a given value. The given value may be substantially 0. That is, N-point learning may be performed such that Expressions (1) and (2) are established.

$$\Sigma \Delta YRi \cong 0 \quad (1)$$

$$\Sigma \Delta LAi \cong 0 \quad (2)$$

According to the steering control device 1B of this embodiment, the N-point learning unit 15B performs N-point learning such that the absolute value of the N-point error total value in each operation system of the target is smaller than a given value (or substantially 0). Accordingly, it is possible to reduce the average of the N-point errors in each operation system. Therefore, it is possible to maintain the N point of each motion in the high precision state.

Figure 13:
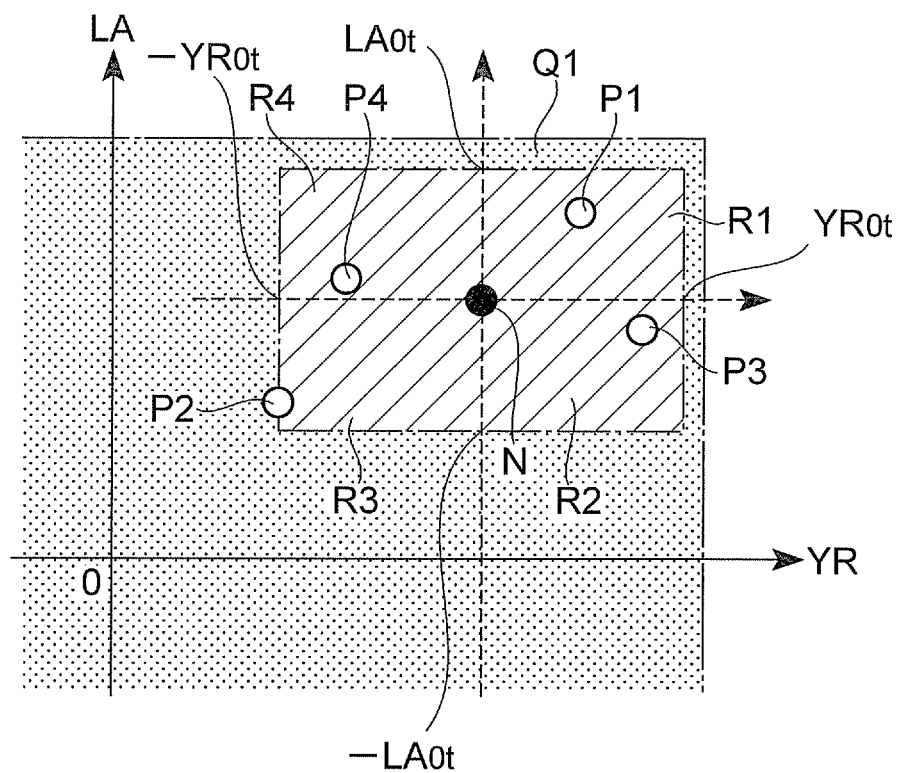
FIG. 13 is a diagram showing another example of N-point error region determination and quadrant restriction.

In Steps S20 and S30, as in the example of FIG. 13, N-point learning may be controlled such that sub operation system errors P1 to P4 which are errors of the sub operation system are arranged around a main operation system error N which is an error in the rotational operation. In other words, N-point learning may be performed such that the N-point error total value is substantially equal to the main operation system error N. That is, N-point learning may be performed such that Expressions (3) and (4) are established.

$$\Sigma \Delta (YRi - YR0) \cong 0 \quad (3)$$

$$\Sigma \Delta (LAi - LA0) \cong 0 \quad (4)$$

In Expressions (3) and (4), the following is defined.
YR0: yaw rate error of main operation system
LA0: lateral G error of main operation system The quadrants R1 to R4 in FIG. 13 are the regions which are defined by the yaw rate threshold value YR0t and the lateral G threshold value LA0t with the main operation system as reference.

The quadrant restriction centering on the main operation system error N is made by performing N-point learning such that N-point learning of the main operation system is first performed, and sub operation system errors are arranged around the main operation system. Alternatively, the quadrant restriction may be made by performing N-point learning such that N-point learning of the sub operation systems are first performed, and the main operation system error is arranged at the center of the error range of the sub operation system. With this N-point learning process, it is possible to further reduce variations in the errors of the operation systems.

Although in the example shown in FIGS. 12 and 13, for ease of understanding, the yaw rate threshold value YRt and the lateral G threshold value LAt in each operation system, or the yaw rate threshold value YR0t and the lateral G threshold value LA0t with the main operation system as reference are the same, the threshold values may be different for each operation system.

Fourth Embodiment

Figure 14:
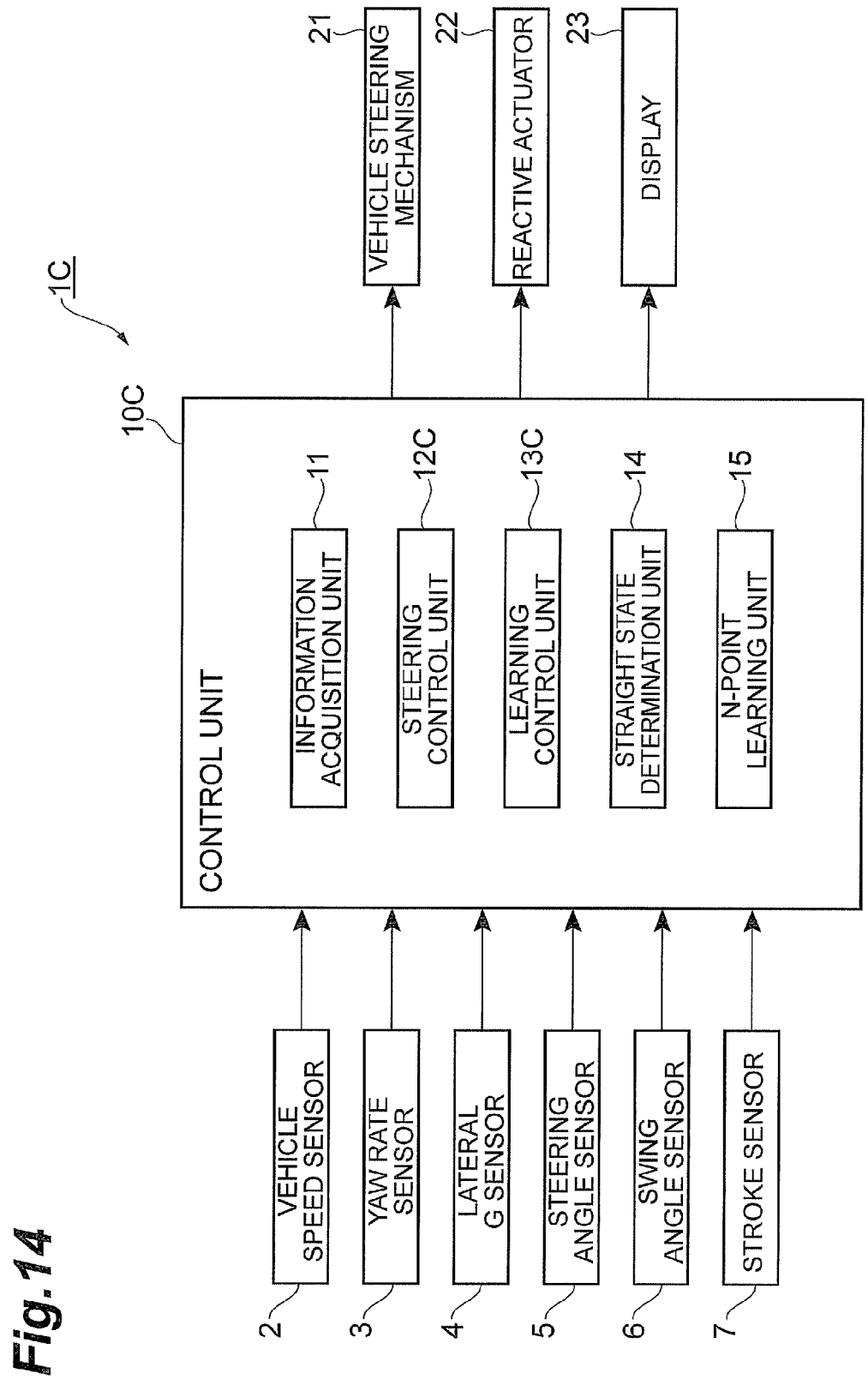
FIG. 14 is a block diagram showing a steering control device according to a fourth embodiment.

FIG. 14 is a block diagram showing a steering control device according to a fourth embodiment. A control unit 10C of a steering control device 1C of this embodiment shown in FIG. 14 is different from the control unit 10A of the second embodiment shown in FIG. 6 in that a steering control unit 12C which does not make operation restriction of the main operation system is substituted for the steering control unit 12A, and a learning control unit 13C which initially completes N-point learning of the main operation system and then selects the sub operation system of the target is substituted for the learning control unit 13A.

Similarly to the steering control unit 12A, the steering control unit 12C has a function of calculating the control amount on the basis of the operating amount in each operation system of the rotational operation, the swing operation, and the push-pull operation of the steering wheel 20 and performing steering control of the vehicle M in accordance with the calculated control amount. While N-point learning is being performed in the sub operation system of the target, the steering control unit 12C of this embodiment reduces the control amount in the sub operation system other than the target and does not make operation restriction of the main operation system. If N-point learning by the learning control unit 13C ends, the steering control unit 12C releases the operation restriction in the sub operation system other than the target.

Similarly to the learning control unit 13A, the learning control unit 13C has a function of performing warning message display control during the operation restriction of the sub operation system by the steering control unit 12C or display end control of the warning message. The learning control unit 13C of this embodiment controls the N-point learning unit 15 such that N-point learning of the main operation system is first performed, and then N-point learning of the main operation system is completed. Thereafter, the learning control unit 13C selects the sub operation system of the target and controls the N-point learning unit 15 such that N-point learning of the sub operation system is performed.

Figure 15:
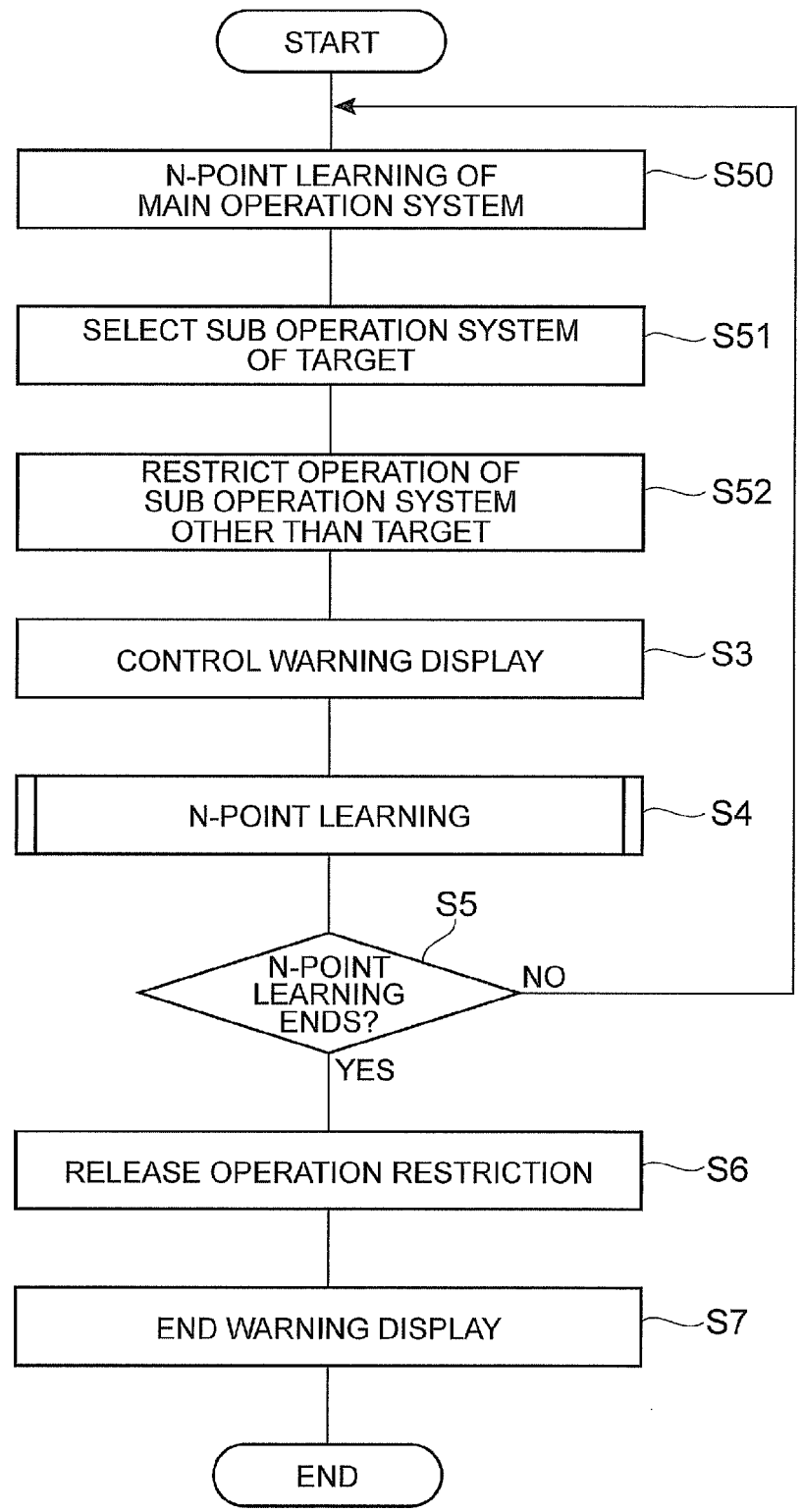
FIG. 15 is a flowchart showing a procedure in the steering control device of FIG. 14.

Subsequently, the operation of the steering control device 1C configured as above will be described. FIG. 15 is a flowchart showing a procedure in the steering control device 1C. The process in FIG. 15 is repeatedly executed by the control unit 10C in a predetermined cycle.

The learning control unit 13C controls the N-point learning unit 15 such that N-point learning of the main operation system is initially performed, and N-point learning of the main operation system is completed (S50). Next, the learning control unit 13C selects the sub operation system of the target, and controls the N-point learning unit 15 N-point learning of the selected sub operation system is performed (S51).

Next, the steering control unit 12C reduces the control amount in the sub operation system other than the target while N-point learning is performed in the sub operation system of the target (S52). The sub operation system in which operation restriction is made in Step S52 may be one sub operation system other than the target in which N-point learning is performed, or may be a plurality of sub operation systems.

According to the steering control device 1C of this embodiment, when N-point learning of a motion in a sub operation system is performed, operation restriction in the main operation system is not made, thereby operating the vehicle M through the main motion without problem.

Although the embodiments of the invention have been described, the invention is not limited to the foregoing embodiments. For example, although in the foregoing embodiments, a case where the so-called steer-by-wire vehicle steering mechanism 21 is used has been described, the invention may be applied to a steering mechanism in which the steering wheel 20 and the vehicle steering mechanism 21 are mechanically linked to each other. Although in the foregoing embodiments, a case where N-point learning is performed has been described, the invention may be applied to overall reference point adjustment (initialization) including gain or offset. The N-point learning frequency of the main operation system increases compared to the N-point learning frequency of the sub operation system during N-point learning of each operation system, thereby appropriately selecting the target.

Although in the foregoing embodiments, a case where the reference point is the neutral point of the input input by the steering operating unit, the reference point is not limited to the neutral point and may be a predetermined point different from the neutral point.

In the foregoing embodiments, a case has been described where the learning control unit 13 performs control such that N-point learning is performed when the absolute value of the operating amount in the operation system other than the target is smaller than the predetermined operating amount threshold value. Meanwhile, even if the absolute value of the operating amount in the operation system other than target is smaller than the predetermined operating amount threshold value, when the change rate of the operating amount (for example, operating angular velocity) exceeds a predetermined value, control may be performed such that N-point learning is not performed. The learning control unit 13 may perform control such that N-point learning is performed under the condition that the absolute value of the operating amount in the operation system other than the target is continuously smaller than the predetermined operating amount threshold value for the given time.

In the foregoing embodiments, a case has been described where the N-point learning unit 15 defines the operating amount $\theta i0$ when it is determined that the vehicle M is in the straight state (when the given time $T_0$ has elapsed) as the N point, and defines the yaw rate $\Delta YRi$ and the lateral G $\Delta LAi$ at that time as errors at the time of N point acquisition. Meanwhile, the value of the N point or the value of the error at the time of N point acquisition is not limited to the value when the given time $T_0$ has elapsed. For example, the N-point learning unit 15 may calculate the average value of the operating amount $\theta i$ of the target within the given time $T_0$ and may define the average value as the N point, or may calculate the average values of the yaw rate YR and the lateral G LAi within the given time $T_0$ and may define these average values as errors at the time of N point acquisition.

INDUSTRIAL APPLICABILITY

According to the invention, it is possible to adjust reference points of a plurality of motions, which are used for a steering operation in a steering operating unit, with high precision.

REFERENCE SIGNS LIST 1, 1A to 1C: steering control device, 10, 10A to 10C: control unit, 14: straight state determination unit (traveling state determination means), 15, 15B: N-point learning unit (reference point adjustment unit), 19: steering shaft, 20: steering wheel, LS: shaft line, M: vehicle, $\theta i$, $\theta j$: operating amount, $\theta t$: operating amount threshold value (predetermined value), LAt: lateral G threshold value (given value), $\Delta LAi$: lateral G error (differential value), YRt: yaw rate threshold value (given value), $\Delta YRi$: yaw rate error (differential value).

The invention claimed is:

1. A steering control device comprising:
a steering operating unit arranged to be steered through a plurality of different steering motions; and
a control unit which performs steering control of a vehicle through a plurality of steering operation systems corresponding to the plurality of steering motions on a basis of an input value input by each of the plurality of steering motions, wherein, when adjusting a reference point of a steering motion in at least one steering operation system from among the plurality of steering operation systems, the control unit reduces a control amount in at least one steering operation system from among steering operation systems other than the steering operation system where the reference point is adjusted.

2. The steering control device according to claim 1, wherein, while a reference point of a steering motion in one steering operation system included in the plurality of steering operation systems is being adjusted, the control unit does not adjust a reference point of a steering motion in another steering operation system different from the one steering operation system.

3. The steering control device according to claim 1, wherein the control unit adjusts a reference point of a steering motion in the plurality of steering operation systems in a prescribed sequence.

4. The steering control device according to claim 3, wherein the plurality of steering motions in the steering operating unit include a rotational motion of rotating a steering wheel around a shaft line of a steering shaft connected to the steering wheel, and the control unit initially adjusts a reference point in a steering operation system corresponding to the rotational motion.

5. The steering control device according to claim 1, wherein the control unit includes a traveling state determination unit which calculates a differential value of a traveling state of the vehicle relative to a reference traveling state, and determines that the vehicle is in the reference traveling state when an absolute value of the differential value is continuously smaller than a predetermined threshold value for a given time, and a reference point adjustment unit which, when the traveling state determination unit determines that the vehicle is in the reference traveling state, adjusts a reference point such that an absolute value of a value obtained by totaling the differential value at the time of reference point adjustment in each steering operation system as an adjustment target is smaller than a given value.

6. The steering control device according to claim 1, wherein the plurality of steering motions in the steering operating unit include a main steering motion and a sub steering motion other than the main steering motion, and when adjusting a reference point of a steering motion in a sub steering operation system corresponding to the sub steering motion, the control unit does not reduce a control amount in a main steering operation system corresponding to the main steering motion.

7. The steering control device according to claim 1, wherein, when a speed of the vehicle is higher than a predetermined speed, the control unit adjusts a reference point of a steering motion in at least one steering operation system from among the plurality of steering operation systems.

8. The steering control device according to claim 1, wherein the control unit adjusts a reference point of a steering motion in at least one steering operation system from among the plurality of steering operation systems on a basis of at least one of a yaw rate and a lateral G of the vehicle.

* * * * *